(12) United States Patent
Fly et al.

(10) Patent No.: US 10,474,689 B1
(45) Date of Patent: Nov. 12, 2019

(54) MODEL SCORE RECALL FOR MACHINE LEARNING SYSTEMS AND APPLICATIONS

(71) Applicant: Quickpath Analytics, Inc., San Antonio, TX (US)

(72) Inventors: Edward Alexander Fly, San Antonio, TX (US); Trent McDaniel, San Antonio, TX (US)

(73) Assignee: Quickpath, Inc., San Antonio, TX (US)

( * ) Notice: Subject to any disclaimer, the term of this patent is extended or adjusted under 35 U.S.C. 154(b) by 0 days.

(21) Appl. No.: 16/396,605

(22) Filed: Apr. 26, 2019

Related U.S. Application Data

(60) Provisional application No. 62/663,225, filed on Apr. 26, 2018.

(51) Int. Cl.
*G06F 16/2457* (2019.01)
*G06N 20/00* (2019.01)

(52) U.S. Cl.
CPC ....... *G06F 16/24578* (2019.01); *G06N 20/00* (2019.01)

(58) Field of Classification Search
CPC .................... G06F 16/24578; G06N 20/00
See application file for complete search history.

(56) References Cited

U.S. PATENT DOCUMENTS

| | | | | |
|---|---|---|---|---|
| 2016/0306876 A1* | 10/2016 | Nichols | .................. | G06N 7/005 |
| 2018/0240041 A1* | 8/2018 | Koch | ........................ | G06N 3/08 |
| 2018/0276861 A1* | 9/2018 | Wright | .................. | G06T 11/206 |
| 2019/0102700 A1* | 4/2019 | Babu | ...................... | G06N 5/046 |
| 2019/0147076 A1* | 5/2019 | Yang | ........................ | G06N 5/02 |

OTHER PUBLICATIONS

Horvitz et al., On Discarding, Caching, and Recalling Samples in Active Learning, 2007, pp. 209-216 (Year: 2007).*

* cited by examiner

*Primary Examiner* — Jorge A Casanova
(74) *Attorney, Agent, or Firm* — Shah IP Law, PLLC; Samar Shah

(57) ABSTRACT

The present disclosure is for a system and a method for processing scoring request in a machine learning system in a computationally efficient and low-cost manner to enable near real-time scoring of incoming scoring requests. Specifically, the present invention is a for a model score recall system and method that enables a system to recall model scores for input rows of cross features values that have already been scored a machine learning model without having to perform a search on very large datasets. As such, the present disclosure provides a system and a method for obtaining scores provided by a machine learning model without having to run the model on each new incoming scoring request, which saves computational resources and saves costs associated with performing a compute transaction.

20 Claims, 9 Drawing Sheets

| Model Name | Cust ID | State | Age Band | Gender | ... | Var N | Score |
|---|---|---|---|---|---|---|---|
| Customer Churn Model v2 | 1 | AK | 20-30 | M | | xyz | 0.923 |
| Customer Churn Model v2 | 2 | GA | 20-30 | F | | xyz | 0.875 |
| Customer Churn Model v2 | 3 | GA | 30-40 | M | | xyz | 0.722 |
| Customer Churn Model v2 | 4 | TX | 30-40 | F | | xyz | 0.694 |
| Customer Churn Model v2 | 5 | TX | 30-40 | F | | xyz | 0.694 |
| Customer Churn Model v2 | 6 | CA | 40-50 | M | | xyz | 0.555 |
| Customer Churn Model v2 | 7 | CA | 40-50 | M | | xyz | 0.555 |
| Customer Churn Model v2 | ... | ... | ... | ... | | ... | ... |
| Customer Churn Model v2 | N | CA | 40-50 | M | | xyz | 0.334 |

Fig. 9A

| Model Name | Variable Combination Checksum | State | Age Band | Gender | ... | Var N | Score |
|---|---|---|---|---|---|---|---|
| Customer Churn Model v2 | xxxyyyzzzz00000001 | AK | 20-30 | M | | xyz | 0.923 |
| Customer Churn Model v2 | xxxyyyzzzz00000002 | GA | 20-30 | F | | xyz | 0.875 |
| Customer Churn Model v2 | xxxyyyzzzz00000003 | GA | 30-40 | M | | xyz | 0.722 |
| Customer Churn Model v2 | xxxyyyzzzz00000004 | TX | 30-40 | F | | xyz | 0.694 |
| Customer Churn Model v2 | xxxyyyzzzz00000005 | CA | 40-50 | M | | xyz | 0.555 |
| Customer Churn Model v2 | ... | ... | ... | ... | | ... | ... |
| Customer Churn Model v2 | xxxyyyzzzz00000007 | CA | 40-50 | M | | xyz | 0.334 |

Fig. 9B

MODEL SCORE RECALL FOR MACHINE LEARNING SYSTEMS AND APPLICATIONS

CROSS-REFERENCE TO RELATED APPLICATIONS

This application claims priority to U.S. Provisional Patent Application Ser. No. 62/663,225, filed Apr. 26, 2018 entitled "Model score recall system for machine learning applications." The entire content of that application is incorporated herein by reference.

BACKGROUND

Field of the Art

This disclosure relates to systems and methods for improving machine learning systems and applications. More specifically, the present disclosure relates to systems and methods for recalling model scores for faster and more efficient processing of data based on machine learned algorithms.

Discussion of the State of the Art

Machine learning/scoring systems that generate machine learned models, and score incoming data requests based on the learned models require significant computing resources and costs to deploy effectively. Often, because of the processing requirements, these systems are unable to make real-time or near real-time predictions. If the systems are enabled to make near real-time predictions, then the hardware and software deployment costs are often significant.

Cloud scoring APIs, such as Amazon's AWS®, or Microsoft's Azure® also present significant costs when dealing with a large number of incoming scoring requests. Cloud scoring APIs typically bill users for using their machine learning systems, the computing time required to build a machine learned model, and a prediction fee for each subsequent prediction that is made by the system using the machine learned model. The prediction fee includes charges for batch predictions as well as real-time predictions, and may also include additional charges for storing the model during the prediction phase. Prediction fees for cloud scoring APIs can often cost as much as a penny per prediction, and represent a significant cost burden when a large number of predictions are required.

SUMMARY

The present invention is for a computer program product comprising a non-transitory computer readable storage medium having instructions encoded thereon that, when executed by a processor, cause the processor to receive a scored dataset, wherein the scored dataset is a training dataset that has been scored by a machine learning model, the scored dataset comprising scores associated with input rows of cross features value within the dataset, flag certain features within the scored dataset, the flagged features being identified as having low relevance to the scores provided by the machine learning model, convert certain feature values within the scored dataset, the converted feature values identified as input row of cross feature values that have a high likelihood of receiving similar scores from the machine learning model, compress the received scored dataset, the compressed scored dataset comprising features that have been flagged as having low relevance to scores provided by the machine learning model, and comprising converted feature values, receive new scoring request, prepare the new scoring request, determine whether the prepared new scoring request matches an input row of cross feature values in the compressed scored dataset, retrieve score associated with a matching input row of cross feature values in the compressed scored dataset if a match is determined between the prepared new scoring request and an input row of cross feature values in the compressed scored dataset, pass the new scoring request to a scoring system if the prepared new scoring request does not match an input row of cross feature values in the compressed dataset, and obtain a new score provided by the scoring system for a new scoring request that does not match an input row of cross features values in the compressed dataset, and determine whether to store the new scoring request and the obtained new score as an input row of cross feature values in the compressed dataset.

The present inventions is also for a computer-implemented method comprising, receiving a scored dataset, wherein the scored dataset is a training dataset that has been scored by a machine learning model, the scored dataset comprising scores associated with input rows of cross features value within the dataset, flagging certain features within the scored dataset, the flagged features being identified as having low relevance to the scores provided by the machine learning model, converting certain feature values within the scored dataset, the converted feature values identified as feature values that have a high likelihood of receiving similar scores from the machine learning model, compressing the received scored dataset, the compressed scored dataset comprising features that have been flagged as having low relevance to scores provided by the machine learning model, and comprising converted feature values, receiving new scoring request, preparing the new scoring request, determining whether the prepared new scoring request matches an input row of cross feature values in the compressed scored dataset, retrieving a score associated with a matching input row of cross feature values in the compressed scored dataset if a match is determined between the prepared new scoring request and an input row of cross feature values in the compressed scored dataset, pass the new scoring request to a scoring system if the prepared new scoring request does not match an input row of cross feature values in the compressed dataset, and obtaining a new score provided by the scoring system for a new scoring request that does not match an input row of cross features values in the compressed dataset, and determine whether to store the new scoring request and the obtained new score as an input row of cross feature values in the compressed dataset.

In one embodiment, flagging certain features as having low relevance to scores provided by the machine learning model is further comprised of identifying feature values that are unique throughout a feature within the scored dataset. Identifying unique feature values is further comprised of identifying feature values that have been partially redacted for privacy or security purposes. The converting step may be further comprised of converting numerical feature values into categorical feature values. A binning, scaling, and/or imputation methodology may be used to covert feature values that have a high likelihood of receiving similar scores from the machine learning model.

In one embodiment of the invention, a cryptographic hash function may be applied to compress input rows of cross feature values within the received scored dataset. In one embodiment, a checksum function may be applied to compress input rows of cross feature values within the received scored dataset.

In one embodiment of the invention, the new scoring requests may be received from a data intercept system. More particularly, the new scoring requests are received in near real-time to enable the claimed computer-implemented method to process the new scoring request, match the processing scoring request to input rows of cross feature values in the compressed dataset, and retrieve a matching score if a match is detected in near real-time.

In one embodiment of the invention, preparing the new scoring request is further comprised of converting numerical feature values into categorical feature values. Determining whether the prepared new scoring request matches an input row of cross feature values in the compressed scored dataset may be further comprised of compressing the prepared new scoring request. A hash function is applied to obtain the compressed scored dataset and the compressed prepared new scoring request. A match between the compressed prepared new scoring request and an input row of cross feature values in the compressed scored dataset is determined if the hash value associated with the compressed prepared new scoring request is the same as the hash value associated with an input row of cross feature values in the compressed scored dataset. The match detection methodology enabling near real-time matching between compressed prepared new scoring requests and input rows of cross feature values in the compressed scored dataset.

In one embodiment of the invention, the compressed prepared new scoring request and the score provided by a scoring system are compressed and stored as input row of cross feature values within the compressed scored database. The invention may be further comprised of identifying how a score was obtained for a new scoring request and/or destroying the compressed scored database if the machine learning model is updated.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 9A illustrates an exemplary dataset that may be processed in accordance with an exemplary embodiment of the invention.

FIG. 9B illustrates an exemplary dataset that has been compressed in accordance with an exemplary embodiment of the invention.

DETAILED DESCRIPTION

Figure 1:
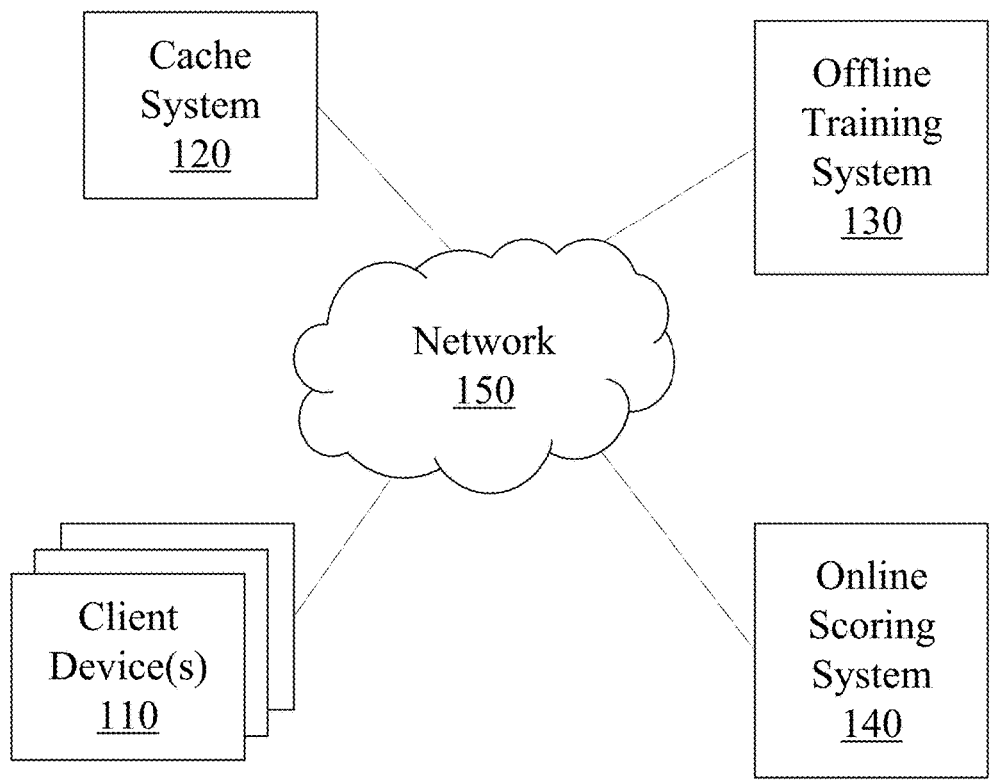
FIG. 1 illustrates various elements of an exemplary model score recall system, according to one embodiment.

The inventive system and method (hereinafter sometimes referred to more simply as "system" or "method") described herein significantly reduces the computing resources, computing time, and costs associated with making predictions in a deployed machine learning system, regardless of whether the predictions are made using a deployed system or a cloud scoring API. Specifically, the inventive system stores certain predictions once they are made, processes the stored data, and uses stored predictions if newly requested predictions meet certain similarity criteria associated with the stored predictions. The inventive system described herein reduces the computing resources, computing time, and costs cost associated with making predictions in a dedicated, or shared/rented machine learning system environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary embodiment of a model score recall system according to one embodiment. The system includes an offline training system 130, an online scoring system 140, client device(s) 110, a cache system 120, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The offline training system 130 trains a machine learning model from "offline" training data. Specifically, the offline training system 130 trains a model by batch processing the training data. The offline training system 130 is described in greater detail in FIG. 2A, but in general, the offline training system 130 may use any "offline" learning algorithm that may be known to a person of ordinary skill in the art without departing from the scope of the invention, including, large-scale distributed training of decision trees, linear and logistic models, unsupervised models (k-means), time series models, deep neural networks, etc. The offline training system 130 may include a model configurator for configuring the training job. It may specify model type, hyper-parameters, data source reference, and feature DSL expressions, as well as compute resource requirements (the number of machines, how much memory, whether or not to use GPUs, etc.). The offline training system 130 may also include a performance evaluator, which may evaluate the model based on any number of evaluation methodologies that are known to a person of ordinary skill in the art, including, but not limited to ROC curve and PR curve, etc.

The online scoring system 140 makes predictions based on the models that are trained by the offline training system 130, and data that is fed to the online scoring system 140. The specific features of the online scoring system 140 are described in greater detail in FIG. 2B. But generally, the online scoring system 140 batch scores the training data and generates a baseline that measures the difference in performance between the offline training model generated by the offline training system 130, and the scores generated by the online scoring system 140. Once a baseline is established, it is constantly updated based on new predictions or classifications made by the online scoring system 140. The online scoring system 140 also measures drift between the models created by the offline training system 130 and the predictions made by the online scoring system 140. As mentioned above, and described in more detail below, the predictions or classifications made by the online scoring system 140 drifts over time as the system is presented with new data that has different values, distribution, or patterns than the training data. The inventive online scoring system 140 measures this drift in near real-time as predictions or classifications are made on new incoming scoring request data. If the detected drift rises above a predetermined level, automatic or manual intervention may be recommended, as described in greater detail below. In this manner, the system is enabled to detect performance degradation of the online scoring system 140 in an operational scoring environment.

The cache 120 stores predictions made by the batch scoring system/the offline training system 130, and the real-time predictions made by the online scoring system 140. Moreover, the cache 120 stores categories and category values associated with each prediction, such that, if a new request is made with the same categories and/or category values the predictions that are already stored in the cache may be used without having to make new prediction requests. In one embodiment, the cache 120 prepares categories and/or category values associated with certain categories and/or category values to ensure that two incoming scoring requests that are sufficiently close to each other—i.e. requests that will receive the same prediction score or classification—are recognized as such (i.e. that sufficiently close score requests are not treated as unique requests). Moreover, the cache also excludes certain categories and/or category values that tend to be unique to each scoring request and/or tend to not have any impact on the prediction scores. The filtering/exclusion system ensures that incoming scoring requests that are sufficiently close to cached requests receive a prediction score from the cache.

Client device(s) 110 include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 110. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application 110 obtains data from the network 110 and displays it to the user within the application 533 interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Offline Training System and Online Scoring System

Figure 2A:
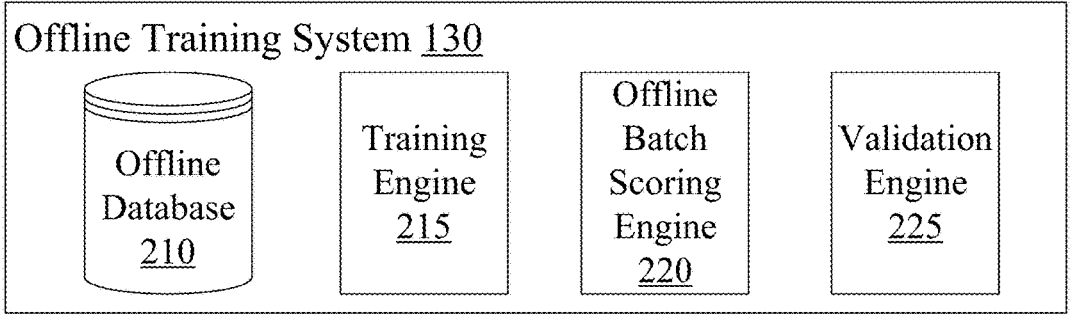
FIG. 2A illustrates the offline training system of the presently disclosed machine learning system that utilizes online and offline processing associated with the model score recall system, according to one embodiment.

FIG. 2A illustrates an exemplary embodiment of the offline training system 130. The offline training system 130 generates machine learning models based on training data, wherein the models may be used score or classify incoming requests. The offline training system 130 includes an offline database 210, a training engine 215, and offline batch scoring engine 220, and a validation engine 225. Other system and databases may be used, as would be readily understood by a person of ordinary skill in the art, without departing from the scope of the invention The offline database 210 stores one or more datasets for use in an offline machine learning training environment. The offline database 210 is illustrated within the offline training system 130 for illustration purposes. It may reside inside or outside the offline training system 130, as would be readily understood to a person of ordinary skill in the art. Exemplary databases 210 include a database for storing data, a database for storing features, a database for storing outcomes or training sets, a database for storing models. Other databases may be used, as would be readily understood to a person of ordinary skill in the art, without departing from the scope of the invention.

The training engine 215 generates machine learned models from training datasets. As would be readily understood by a person of ordinary skill in the art, any suitable training methodology may be used without departing from the scope of the invention. Exemplary training methodologies include, but are not limited to, distributed training of decision trees, linear and logistic models, unsupervised models, time series models, deep networks, etc.

In the offline batch scoring engine 220 scores test data based on the models that are generated by the training engine 215. Batch scoring refers to a type of processing where an entire data set or large portion of the data set is processed through a single or recurring job. In the off-line batch scoring engine 220 may use any system that would be readily apparent to a person of ordinary skill in the art for the purposes of scoring a training data set in an off-line machine learning environment.

The validation engine 225 validates the dataset scored by the off-line batch scoring engine 220. The validation may perform a variety of different functions, including determining how well the model has been trained, and to estimate model properties, such as mesne error for numeric predictors classification errors for classifiers recall and precision for IR models, etc. A variety of different validation methodologies may be used, as would be readily understood to a person of ordinary skill in the art, without departing from the scope of the invention.

Figure 2B:
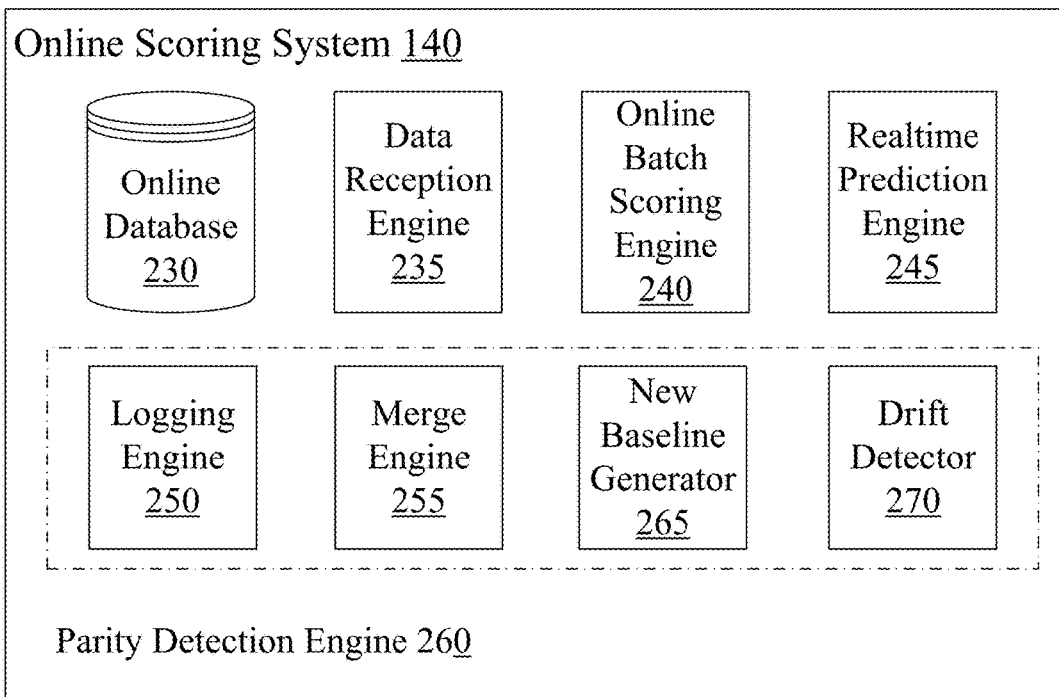
FIG. 2B illustrates the online scoring system of the presently disclosed machine learning system that utilizes online and offline processing associated with the model score recall system, according to one embodiment.

FIG. 2B illustrates an online scoring system 140, which scores incoming scoring requests, and establishes the baseline for detecting performance degradation. The online scoring system 140 comprises of an online database 230, a data reception engine 235, an online batch scoring engine 240, a real-time prediction engine 245, a logging engine 250, a merge engine 255, a parity detection engine 260, which includes a new baseline generator 265, and a drift detector 270.

The online database 230 refers to a variety of databases that may be used to make near real-time predictions in an online environment. The online database 230 may include, for example, a feature store database, wherein some of the features needed for near real-time compute may be precomputed and stored. Other databases 230 may include a database of metrics, which may be used to generate aggregate features, and databases for storing incoming scoring requests. The specific number and types of databases 230 may vary depending on the type of machine learning implementation model that is deployed, as would be readily understood by a person of ordinary skill in the art.

The data reception engine 235, and the real-time prediction engine 245 make predictions for incoming scoring request data. The data reception engine 235 processes incoming scoring requests by parsing the scoring requests, and collecting real time data inputs that may be necessary to score the requests. The real-time prediction engine 245 makes predictions based on the model that is generated by the offline training system 130, and the data processed by the data reception engine 235.

The parity detection engine 260 includes a logging engine 250, a merge engine 255, a baseline generator 265, and a drift detector. The parity detection engine 260 measures the performance degradation of the online scoring system 140 against the model generated by the offline training system 130. The specific mechanism for doing this is discussed in greater detail in FIG. 3, but the various subsystem used to complete this process are described in reference to FIG. 2B.

The logging engine 250 logs batch scores and newly scored online scores. In one embodiment, the logging engine 250 obtains batch scores from the online batch scoring engine 240, which batch scores the offline training dataset that is used by the offline training system 130. In one embodiment, the logging engine logs the online batch scores as "baseline" model scores. The logging engine 250 also obtains newly scored data from the online scoring system 140, and logs newly scored online scores as "test" results. In one embodiment, logging is performed using asynchronous log/event messaging such as Kafka, MQ, or asynchronous direct database inserts.

The merge engine 255 merges offline "baseline" model scores with online "test" scores that are logged by the logging engine 250. In one embodiment, the merge engine 225 uses a combination of cached results for inline anomaly detection and logged results that are comparable in a real time reporting and monitoring solution like the ELK stack.

The drift detector 270, herein also referred to as the deviation analysis engine 270, measures the deviation between the offline "baseline" model and the online "test" model, as presented in the merged results generated by the merge engine 255. The drift detector 270 may use a variety of methods for identifying a drift or a deviation in the merged results. A few specific methodologies are detecting deviations are described in reference to FIGS. 3 and 4, however, other methodologies may be used, as would be readily understood by a person of ordinary skill in the art, without departing from the scope of the invention.

The new baseline generator 265 generates new baselines whenever a model is retrained based on more current, enriched data containing new features. The new baseline generator 265 uses a new version of the trained baseline dataset that would be used from that point forward.

Cache System

Figure 3:
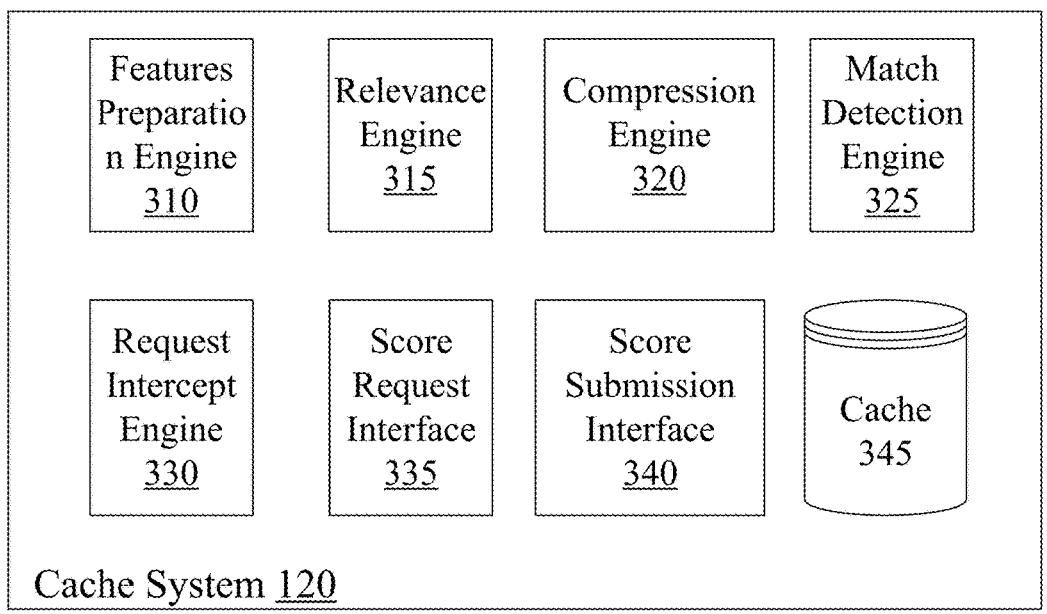
FIG. 3 illustrates components of a model score recall system, according to one embodiment.

FIG. 3 illustrates an exemplary cache system for storing and re-routing incoming scoring requests, in accordance with one embodiment of the invention. The system includes a features preparation engine 310, a relevance engine 315, a compression engine 320, a match detection engine 325, a request intercept engine 330, a score request interface 335, a score submission interface 340, and a cache database 345.

The features preparation engine 310 prepares features in incoming scoring requests to identify scoring requests whose scores have already been predicted, either during batch processing or real-time processing. The features preparation engine 310 may use a variety of different methods to do so, including, without limitation, binning, scaling, imputation, etc. In one embodiment, the features preparation engine 310 converts numerical data associated with each relevant feature value into categorical data. For example, the features preparation engine 310 may convert specific age data associated with scoring requests into buckets or categories with age ranges. A scoring request wherein the age data is 22 may be categorized, for example, into an age range of 21-25. Similarly, the data associated with the number of visits feature may be categorized from a specific feature value of 135 into a feature value of 101-150. The specific determination of which features and/or feature values to prepare varies. Typically, the determination is based on an identification of features and/or feature values that are likely to receive the same prediction score from a machine learned model. The methodologies for identifying features and/or feature values to prepare would be understood by a person of ordinary skill in the art, and are not described in greater detail herein.

FIG. 9A illustrates an exemplary dataset that has been scored by a machine learning model. Is illustrated in FIG. 9A, the dataset may be comprised of the following features: a model name, customer ID, state, age-band, gender, var N, and score. The specific values within each feature is referred to herein, and throughout the specification as feature values. A row may be referred to as an input row of cross feature values. The dataset also illustrates at least one feature values that has been prepared by the features preparation engine 310. For example, the "age band" column represents feature values that have been converted from a specific number (a first feature value) into a category (a second feature value) comprising a range of numbers. As discussed in further detail below, some of the feature values, such as "customer ID" may be marked as being irrelevant by the relevance engine 315.

The relevance engine 315 identifies and/or flags features and/or feature values that are unlikely to have any relevance on prediction scores. Features that are irrelevant from a scoring perspective typically include, but not limited to, a user's unique identification information, such as social security number, email address, etc. The relevance engine 315 also identifies other features and/or feature values that have a low likelihood of relevance (i.e. should not be used because it causes classification errors, or simply has little to no bearing on classification) to the score obtained from the machine learning model. In one embodiment, the model metadata may store feature importance value. Features with a low or a certain importance value may be identified by the relevance engine 315 as having a low likelihood of relevance in terms of obtaining a score from a machine learning model. In this embodiment, feature importance value need not be zero. Very low values, or values at or around a predetermined threshold may be used as an indication identifying a feature with low likelihood of being relevant to the scores obtained from a machine learning model. These flagged features and/or feature values may be ignored when determining if a prediction score already exists in the cache 120.

The compression engine 320 compresses the data that is cached and incoming scoring request data in order to improve the speed and accuracy of the process for determining if a scoring request has already been scored and stored in cache 120. In one embodiment, the compression engine 320 uses a cryptographic hash function, or a cryptographic hash value to determine if an incoming scoring request is the same as a scoring request that is scored and stored in the cache 120. A variety of different cryptographic hash algorithms may be applied, including, but not limited to MD5, SHA-1, etc. In one exemplary embodiment, an image pointer (i.e. a content management system URL) may be used for MD5 caching location to determine if an image is in cache. If it is, then the cached value may be returned. Cryptographic hash functions are one exemplary method of applying compression to enable faster comparison, but, as would be readily understood by a person of ordinary skill in the art, other methodologies may be applied without departing from the scope of the invention.

FIG. 9B illustrates input rows of cross feature values within a dataset that have been compressed by the compression engine 320. In comparison to the table illustrated in FIG. 9A, certain features and/or feature values may be marked as low relevance, such as, in this particular example, the "customer ID" values. Moreover, the value obtained as a result of applying compression are also illustrated. In this case, the compression values are illustrated as "Variable Combination Checksum" in FIG. 9B. These values may be used to determine if there is a match between a new scoring request and an entry that has already been scored and compressed in a dataset. In one embodiment of the invention, once the entries have been compressed via a checksum and/or cryptographic hash function, they may be compressed further by grouping the entries by unique combination of entries or features. This additional step enables the system and the process to identify matches much more quickly. For example, the grouping function may compress a dataset of million entries into a hundred thousand entries. The matching process, which is described elsewhere in this disclosure, may performing a matching function on only the hundred thousand entries, in this particular example, thereby saving compute resources and speeding up the matching and retrieval process.

The match detection engine 325 determines if an incoming scoring request query matches a input row of cross feature values that is already scored and stored in the cache 120. In an embodiment wherein a cryptographic hash function is used to compress the query, the match detection engine 325 compares the hash values of the incoming request query with entries that have already been scored. If there is a perfect match between two hash values, then the match detection engine 325 retrieves the score associated with the matching query. The cached score is thereafter used to complete the online scoring process described above in reference to FIG. 2.

The request intercept engine 330, score request interface 335, and the score submission interface 340 interact with the machine learning scoring systems. The request intercept engine 330 intercepts scoring requests from being passed to the machine learned scoring systems, which typically charge users for calculating a score. The intercepted scoring request is then passed to the compression 320 and match detecting engine 325 to determine if the incoming scoring request has already been scored and stored in the cache 120. If it has not been scored, then the score request interface 335 passes the incoming search request to the machine learning systems to obtain a paid score. Once a paid score is obtained, the score submission interface 340 submits the scoring request and the score to the features preparation engine 310, relevance engine 315, and compression engine 320 for processing and storage.

The cache 345 is an exemplary database wherein compressed scored requests along with their scores are stored. In an embodiment wherein cryptographic hash functions are used, the cache 345 specifically stores the hash value and the score associated with the hash value. Although the cache 345 is illustrated as being within the cache system 120, the cache database(s) 345 may be anywhere and may be accessed by a network interface, as would be readily understood by a person of ordinary skill in the art. Moreover, even though the cache 345 is illustrated as one database, the storage functionality described herein may be implemented across various databases spread out over various locations. The database 345 described herein may be implemented in a number of way, as would be apparent to a person of ordinary skill in the art, without departing from the scope of the invention.

Processes for Recalling Model Scores

Figure 4:
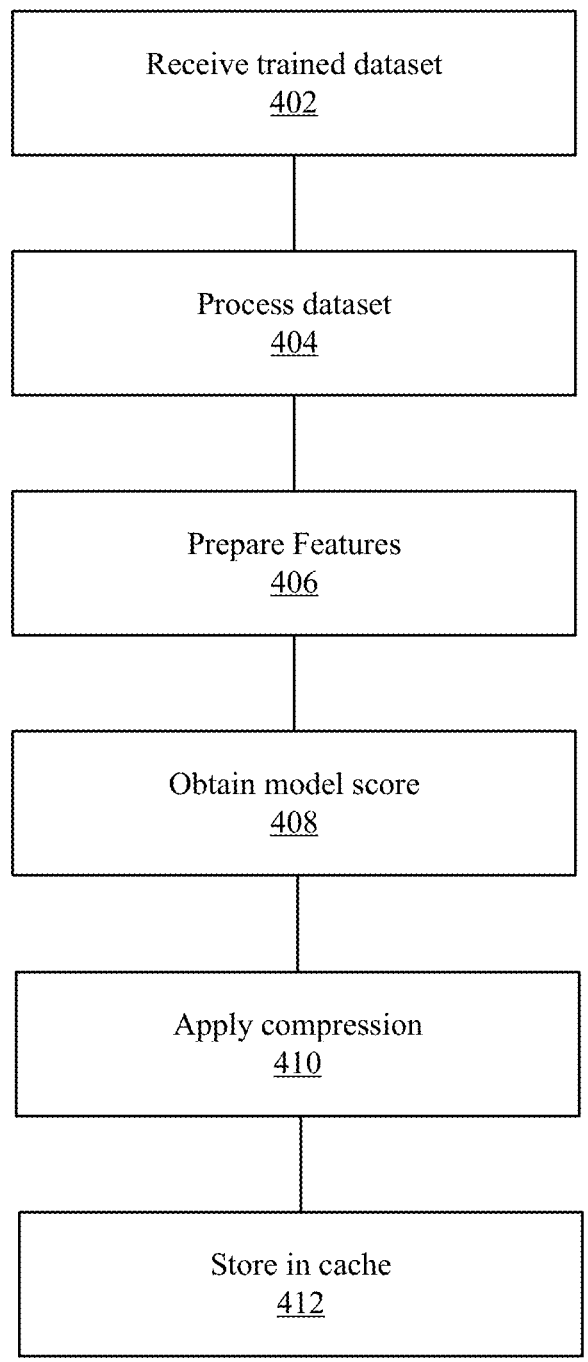
FIG. 4 illustrates a flowchart of an exemplary process for storing model scores, according to one embodiment.

FIG. 4 illustrates an exemplary process for storing scores for queries that have already been scored. The process starts by obtaining a trained dataset 402. The trained data set may be batch scored and may be obtained from the offline training system 130 or the online scoring system 140.

Thereafter, the dataset is processed 404 for features and/or feature values that would not affect the scores. Exemplary features include, but are not limited to, user identifiers such as email, social security numbers, customer IDs, etc. Other features may be used, as would be readily understood by a person of ordinary skill, without departing from the scope of the invention. The features that tend to be unique and/or not impact the scores are, in this manner, ignored by the subsequent compression and match detection steps. The process thereby ensures that otherwise matching scoring queries are not rejected because of unique but ultimately irrelevant data associated with each query.

Data associated with features may also be prepared 406 into categories to ensure that sufficient number of matches are identified by the model score recall process. A number of different preparation methodologies may be used without departing from the scope of the invention, including, but not limited to, binning, scaling (e.g., for high cardinality items), imputation (e.g., for null and/or missing values), normalization, etc. In one exemplary embodiment, features such as age, date of birth, etc. may, for example, be binned in category ranges such as 21-30, etc. The binning process ensures that these types of feature values are banded in similar categories to increase the number of matches during the match process, and reduce the number of paid scores that are obtained from a machine learning system. In one embodiment, features that have a high variance, and some minimal impact on the scores, may be binned in one category wherein the values in the category affect the score similarly. The methodologies to bin feature values would be readily understood by a person of ordinary skill in the art; any of which may be used without departing from the scope of the invention.

Once the training dataset is processed, the process obtains model scores 408 and applies compression to the training dataset. As described above, the model scores may be obtained from the offline training system 130 or the online scoring system 140. In one embodiment, the process applies a checksum or cryptographic hash function 410 to each entry in the processed training data. The cryptographic hash function not only compresses each entry in the training data, but also provides a key or a string of characters that represents each data point for each input rows of cross feature values. A variety of different cryptographic hash functions may be used, which may be known to a person of ordinary skill in the art, including, but not limited to MD5, SHA-1, CRC32, etc. In one embodiment of the invention, once the entries have been compressed via a checksum and/or cryptographic hash function, may be compressed further by grouping the entries by unique combination of entries or features. This additional step enables the system and the process to identify matches much more quickly. For example, the grouping function may compress a dataset of million entries into a hundred thousand entries. The matching process, which is described elsewhere in this disclosure, may performing a matching function on only the hundred thousand entries, in this particular example, thereby saving compute resources and speeding up the matching and retrieval process.

Each entry from the training dataset that has been compressed is thereafter stored 412 in a cache along with the score received by each respective entry. The data stored in the cache may be quickly accessible to enable lookup functions. If an incoming scoring request has a checksum value that matches a stored entry's checksum value, then the score associated with the stored entry may also be applied to the incoming scoring request without having to perform a compute operation on a machine learning system server.

Figure 5:
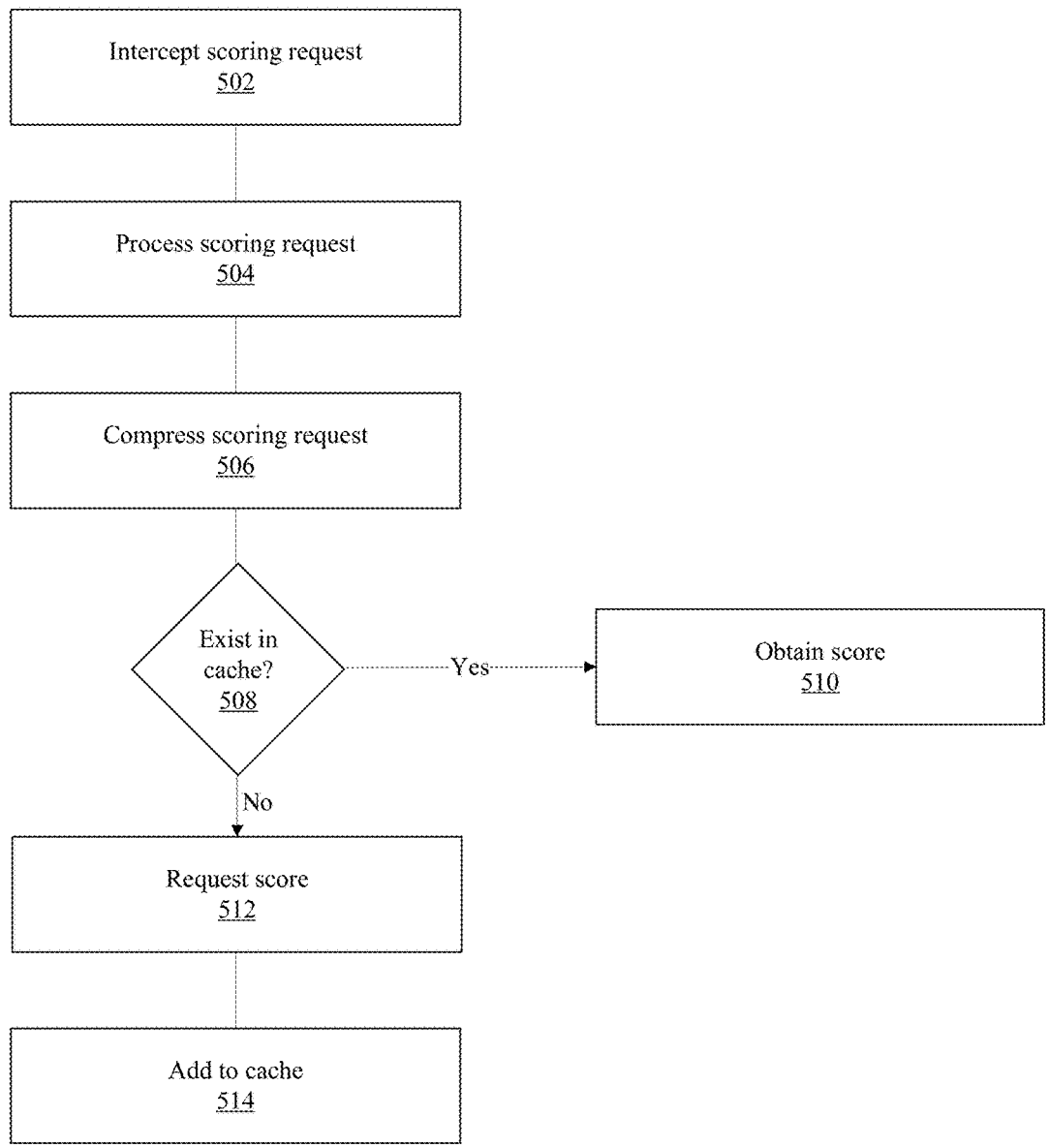
FIG. 5 illustrates a flowchart of an exemplary process for reducing the number of predictions made by a machine learning system, according to one embodiment.

FIG. 5 illustrates an exemplary method for processing new, incoming scoring requests in a machine learning environment wherein near real-time predictions are required. The process begins by intercepting 502 an incoming scoring request. The intercept procedure prevents an incoming request from being processed by the prediction engine in a deployed machine learning system.

Thereafter, the scoring request is processed 504 to remove features and/or feature values that have little to no impact on the score that will be computed using the machine learned model. Furthermore, the scoring request is prepared such that certain feature values are included in categories or buckets that include a range. For example, if the incoming scoring request includes a number 4, the data may be placed in a category ranging from numbers 1-5, etc. Additional detail regarding processing data is provided in reference to FIG. 4, and incorporated herein with reference to incoming data request queries as well.

The process also applies compression 506 to the incoming scoring request. In one embodiment, a checksum or a cryptographic hash function may be applied to compress the processed 504 scoring request, and to make it easier to determine whether the incoming scoring request query matches another query in a cache that has already been scored. A variety of different compressions methodologies may be used, as would be apparent to a person of ordinary skill in the art, without departing from the scope of the invention. Exemplary compression methodologies include, but are not limited to MD5, SHA-1, CRC3, etc. The compression methodology used in this step, 506, must be the same as the compression methodology used on the training data (discussed in FIG. 4 in reference to step 410) to ensure that the two compressed values may be compared quickly and easily. Additional information regarding the compression step is provided in reference to FIG. 4, and incorporated herein by reference.

The process determines 508 if the incoming scoring request exists in cache. A checksum or a cryptographic hash match is used to determine if an incoming scoring request query has been scored and saved in the cache. In one embodiment, wherein the hashed data is stored in a table, a lookup query may be used to determine if there is a match. If there is a match, then the score associated with the matched entry in the table is retrieved 510. If no matches are found, then the scoring request is passed 512 to the online scoring system that uses a trained model. Once the score is assigned to the incoming scoring request, then the score is added 514 to the cache along with the compressed value for the incoming scoring request.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
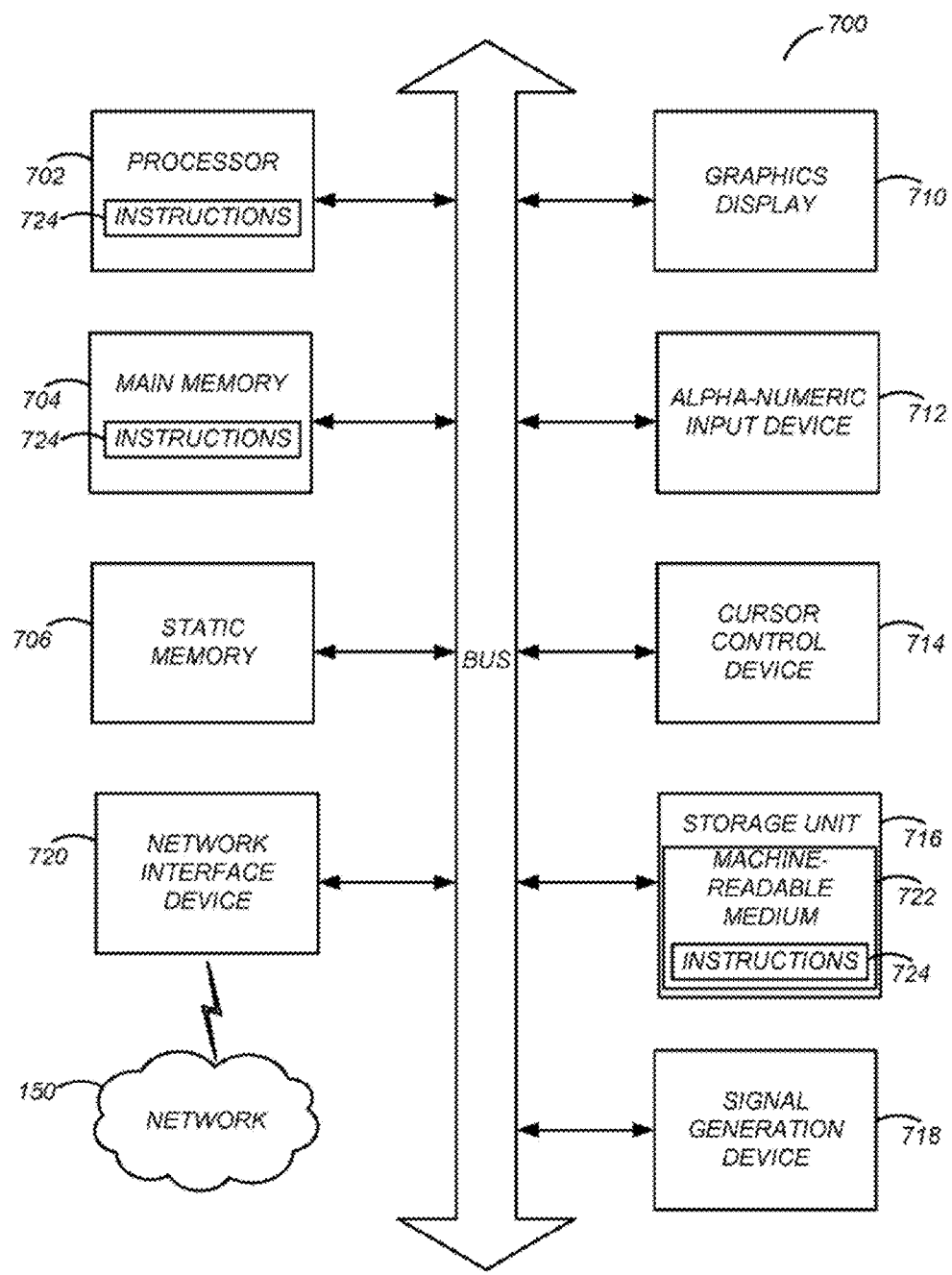
FIG. 6 illustrates one embodiment of components of an example machine able to read instructions from a machine-readable medium and execute them in a processor (or controller).

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 7:
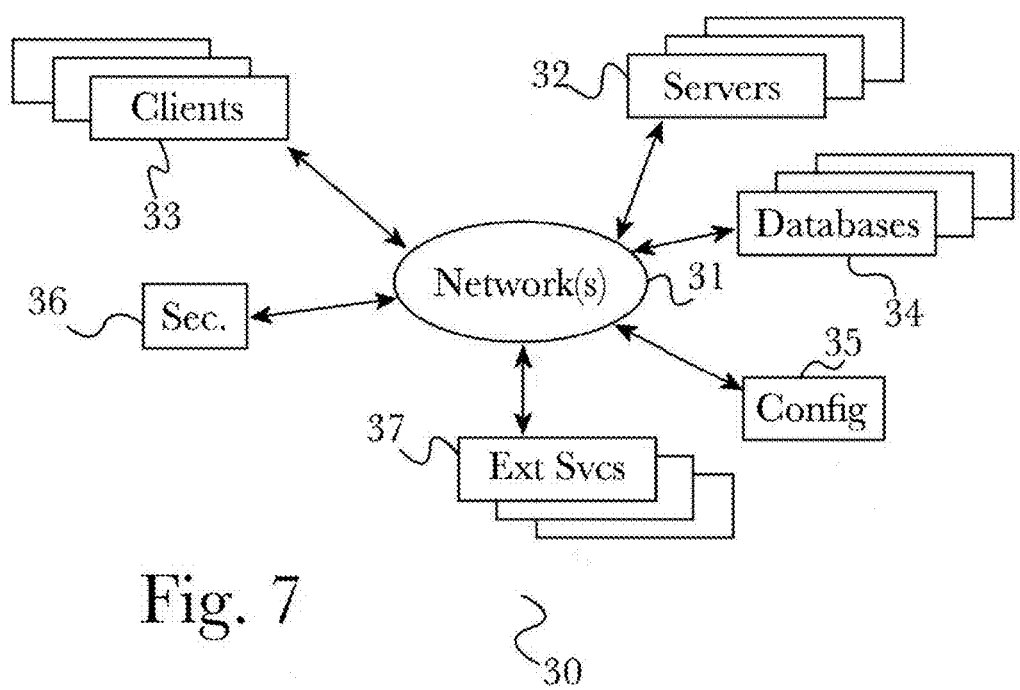
FIG. 7 illustrates on embodiment of the computing architecture that supports an embodiment of the inventive disclosure.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
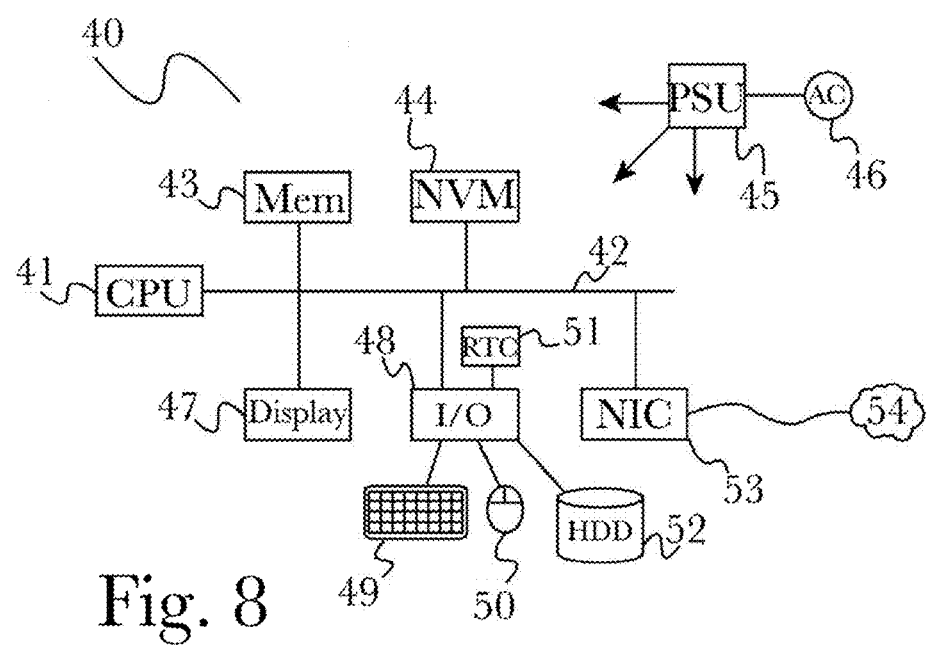
FIG. 8 illustrates components of a computing device that supports an embodiment of the inventive disclosure.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product comprising a non-transitory computer readable storage medium having instructions encoded thereon that, when executed by a processor, cause the processor to:
   receive a scored dataset, wherein the scored dataset is a training dataset that has been scored by a machine learning model, the scored dataset comprising scores associated with input rows of cross features value within the dataset;
   flag certain features within the scored dataset, the flagged features being identified as having low relevance to the scores provided by the machine learning model;
   convert certain feature values within the scored dataset, the converted feature values identified as feature values that have a high likelihood of receiving similar scores from the machine learning model;
   compress the received scored dataset, the compressed scored dataset comprising features that have been flagged as having low relevance to scores provided by the machine learning model, and comprising converted feature values;
   receive new scoring request;
   prepare the new scoring request;
   determine whether the prepared new scoring request matches an input row of cross feature values in the compressed scored dataset;
   retrieve score associated with a matching input row of cross feature values in the compressed scored dataset if a match is determined between the prepared new scoring request and an input row of cross feature values in the compressed scored dataset;
   pass the new scoring request to a scoring system if the prepared new scoring request does not match an input row of cross feature values in the compressed dataset; and
   obtain a new score provided by the scoring system for a new scoring request that does not match an input row of cross features values in the compressed dataset, and determine whether to store the new scoring request and the obtained new score as an input row of cross feature values in the compressed dataset.

2. A computer-implemented method comprising:
   receiving a scored dataset, wherein the scored dataset is a training dataset that has been scored by a machine learning model, the scored dataset comprising scores associated with input rows of cross feature values within the dataset;
   flagging certain features within the scored dataset, the flagged features being identified as having low relevance to the scores provided by the machine learning model;
   converting certain feature values within the scored dataset, the converted feature values identified as feature values that have a high likelihood of receiving similar scores from the machine learning model;
   compressing the received scored dataset, the compressed scored dataset comprising features that have been flagged as having low relevance to scores provided by the machine learning model, and comprising converted feature values;
   receiving new scoring request;
   preparing the new scoring request;
   determining whether the prepared new scoring request matches an input row of cross feature values in the compressed scored dataset;
   retrieving a score associated with a matching input row of cross feature values in the compressed scored dataset if a match is determined between the prepared new scoring request and an input row of cross feature values in the compressed scored dataset;
   passing the new scoring request to a scoring system if the prepared new scoring request does not match an input row of cross feature values in the compressed dataset; and
   obtaining a new score provided by the scoring system for a new scoring request that does not match an input row of cross feature values in the compressed dataset, and determining whether to store the new scoring request and the obtained new score an input row of cross feature values in the compressed dataset.

3. The computer-implemented method of claim 2, wherein flagging certain features as having low relevance to scores provided by the machine learning model is further comprised of identifying feature values that are unique throughout a feature within the scored dataset.

4. The computer-implemented method of claim 3, wherein identifying unique feature values is further comprised of identifying feature values that have been partially redacted for privacy or security purposes.

5. The computer-implemented method of claim 2, wherein the converting step is further comprised of converting numerical feature values into categorical feature values.

6. The computer-implemented method of claim 2, wherein a binning methodology is used to covert feature values that have a high likelihood of receiving similar scores from the machine learning model.

7. The computer-implemented method of claim 2, wherein a scaling methodology is used to convert feature values that have a high likelihood of receiving similar scores from the machine learning model.

8. The computer-implemented method of claim 2, wherein an imputation methodology is used to convert feature values that have a high likelihood of receiving similar scores from the machine learning model.

9. The computer-implemented method of claim 2, wherein a cryptographic hash function is applied to compress input rows of cross feature values within the received scored dataset.

10. The computer-implemented method of claim 2, wherein a checksum function is applied to compress input row of cross feature values within the received scored dataset.

11. The computer-implemented method of claim 2, wherein the new scoring requests are received from a data intercept system.

12. The computer-implemented method of claim 11, wherein the new scoring requests are received in near real-time to enable the claimed computer-implemented method to process the new scoring request, match the processing scoring request to input rows of cross feature values in the compressed dataset, and retrieve a matching score if a match is detected in near real-time.

13. The computer-implemented method of claim 2, wherein the preparing the new scoring request is further comprised of converting numerical feature values into categorical feature values.

14. The computer-implemented method of claim 2, wherein determining whether the prepared new scoring request matches an input row of cross feature values in the compressed scored dataset is further comprised of compressing the prepared new scoring request.

15. The computer-implemented method of claim 14, wherein a hash function is applied to the compressed prepared new scoring request.

16. The computer-implemented method of claim 15, wherein a match between the compressed prepared new scoring request and an input row of cross feature values in the compressed scored dataset is determined if the hash value associated with the compressed prepared new scoring request is the same as the hash value associated with an input row of cross feature values in the compressed scored dataset.

17. The computer-implemented method of claim 16, wherein match detection methodology enables near real-time matching between compressed prepared new scoring requests and input rows of cross feature values in the compressed scored dataset.

18. The computer-implemented method of claim 14, wherein the compressed prepared new scoring request and the score provided by a scoring system are compressed and stored as input rows of cross feature values within the compressed scored database.

19. The computer-implemented method of claim 2, further comprising:
    identifying how a score was obtained for a new scoring request; and
    providing the identification to a requesting system.

20. The computer-implemented method of claim 2, further comprising:
    destroying the compressed scored database if the machine learning model is updated.

* * * * *